Figure 1:
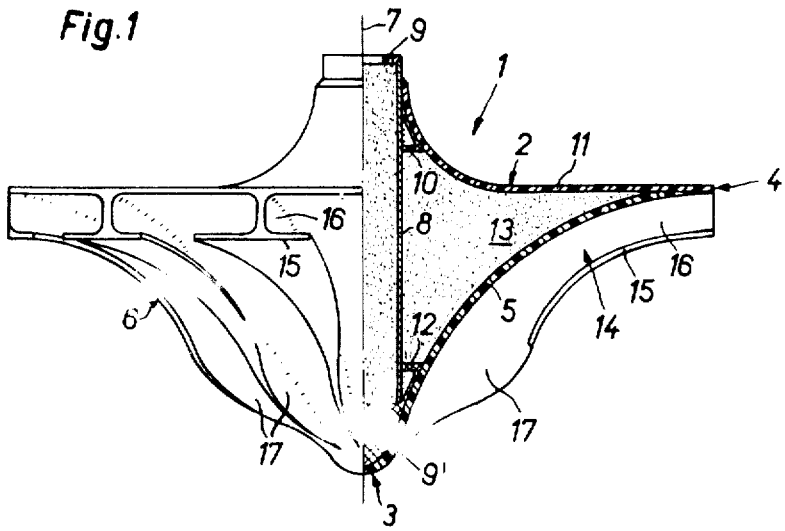

United States Patent

[11] 3,610,590

| [72] | Inventor | Joseph Richard Kaelin<br>Villa Seeburg, Buochs, Nidwalden, Switzerland |
|---|---|---|
| [21] | Appl. No. | 38,254 |
| [22] | Filed | May 18, 1970 |
| [45] | Patented | Oct. 5, 1971 |
| [32] | Priority | May 19, 1969 |
| [33] | | Switzerland |
| [31] | | 7593/69 |

[54] AERATOR IMPELLERS FOR THE AERATION OF LIQUIDS
11 Claims, 7 Drawing Figs.

[52] U.S. Cl. .................................................. 261/91, 210/219, 416/177
[51] Int. Cl. .............................................. B01f 3/04
[50] Field of Search ............................................ 416/188, 180, 176, 177, 179, 182, 183, 185, 235, 236; 261/91; 210/219

[56] References Cited
UNITED STATES PATENTS

| 2,422,615 | 6/1947 | Halford ........................ | 416/188 |
| 3,095,820 | 7/1963 | Sanborn et al. ............. | 415/53 |
| 3,462,132 | 8/1969 | Kaelin .......................... | 261/91 |
| 3,479,017 | 11/1969 | Thikotter ..................... | 261/91 |

FOREIGN PATENTS

| 862,761 | 3/1961 | Great Britain ............... | 261/91 |

OTHER REFERENCES
Simon-Carves, German Printed App. 01,201,815, 9–65, 261–91

Primary Examiner—Tim R. Miles
Attorney—McGlew and Toren

ABSTRACT: A vertical axis aeration impeller for the aeration of liquids, particularly for aerating sewage in aeration tanks comprises a rotor body of inverted frustoconical-shape carrying blades for raising liquid from a lower suction side to an upper peripheral delivery side of the rotor. The outer side of the frustoconical rotor surface is provided with blades extending from the suction side to the delivery side and having a T-shaped profile. The free edge of the web of the T-shaped profile is connected with the frustoconical surface of the rotor body, while the flanges or yoke of the T-profile are spaced from said surface and comprise a wider flange section along one side of the web and a narrower flange section along the other side thereof. The free edges of the flanges of circumferentially adjacent blades are spaced from each other in circumferential direction to provide laterally open flow channels for the liquid which remains in intimate contact with air while being conveyed through the flow channels.

INVENTOR.
JOSEPH RICHARD KAELIN
BY
McGlew & Toren
ATTORNEYS

AERATOR IMPELLERS FOR THE AERATION OF LIQUIDS

The present invention concerns a vertical axis aerator impeller for the aeration of liquids, particularly of sewage to be clarified, of the kind having a rotor body diverging from a lower suction side towards an upper peripheral delivery side and carrying at least one blade ring.

The known aerator impellers can be classified in two principal groups, namely the so-called open and so-called closed aerator impellers. The open aerator impellers can be compared with the impeller of an agitator, while the closed aerator impellers can be compared with an axially sucking radial pump wheel. Characteristic for the quality of an aerator impeller is its specific input capacity, i.e. the quantity of air entered into the liquid per unit of mechanical power consumed for the drive of the wheel.

The highest specific input capacities have been obtained until now with closed impellers, which, however, had to be bargained against some drawbacks. First, a "closed" impeller requires a greater expenditure for its manufacture and in operation it requires an exact conformity of its number of revolutions with the composition of the liquid to be aerated. Moreover, a "closed" impeller is very delicate against clogging by solid bodies present in the liquid to be aerated, particularly filamentous solid materials.

For this reason the closed impellers did not succeed to completely supplant the open ones until now, though the greatest inconvenience consists in their relatively moderate specific input capacity, while they are barely susceptible to clogging.

Among the known "open" aerator impellers the so-called "Vortair" impeller is to be mentioned, which is composed essentially of a flat, circular disc-shaped body having attached to its one side a vertical driving shaft, while the other side facing the liquid and immersed into the same carries a blade ring. The blades of the blade ring extend straight radially or straight and at an angle with respect to the radial direction, or also slightly curved, the surfaces of the blades being at right angles with respect to the surface of the disc body. This "Vortair" impeller has a pronounced surface action, because it may only suck the liquid in a very restricted manner. It practically ripples only the surface of the liquid level and accordingly also its specific input capacity is moderate.

In order to remedy somewhat this deficiency the so-called "Simcar" impellers were constructed which, in contradistinction to the "Vortair" impellers, comprise a conical rotor body diverging upwardly, a blade ring being fixed to its outer conical surface. The blades, in comparison with the blades of the "Vortair" impeller here are considerably longer; they extend until into the immediate proximity of the axis of rotation and sometimes beyond the base surface of the cone-shaped rotor body, extending approximately in the direction of the generatrices of the cone. In this manner the "Simcar" impeller is given rather the effect of a radial pump impeller having a small lifting head and a great delivery output. Its specific input capacity is considerably greater as compared with the "Vortair" impellers, also a certain "depth action" is attained, though the specific input capacity and particularly the depth action is barely comparable with those of the closed impellers.

It is an object of the invention to provide an aerator impeller of the kind mentioned above, the characteristics of which attain at least those of a closed aerator impeller, but which can be compared as to the danger of clogging with the "open" impellers.

For attaining this object the aerator impeller according to the invention is to be constructed in such manner that the liquid delivered by the impeller remains in intimate contact with open air over a large surface area, but that the flow paths are formed to obtain a high-delivery output, while at the same time starting points for accumulation of filamentous solid matter remaining suspended and which would favour clogging during operation being at the same time reduced to a minimum.

The aerator impeller according to the invention comprises a rotor body provided with a blade rim having blades formed with a T-shaped profile, said blades being fast with the rotor body along the free longitudinal edge of the web of the T-shaped profile.

The width of the transverse flange of the T-profile progressively increases in the direction towards the peripheral pressure side. The leading edge of the blades is likewise formed advantageously as extension of the web of the T-shaped profile on the suction side, the height of which extension continuously decreases in axial direction and passes tangentially into the surface of the rotor body. If the impeller is provided with blades exclusively on its outside surface, the rotor body can be formed as a closed, hollow hub member and can accordingly serve as floating body, on which a buoyancy is acting upon operation and compensates at least a part of the downwardly acting forces and accordingly provides a considerable decrease of the load on the bearings of the impeller.

The two sections of the transverse flange projecting beyond the web of the T-profile are advantageously of uneven width, the transition from the web to the rotor body situated beneath the wider section of the transverse flange may present a greater rounding off radius than the transition on the other side of the web.

The transverse flange of the T-shaped profile also can be placed on the web under an angle deviating from 90°, so that the totality of the blades on the impeller have so to say an "imbricated" appearance.

Figure 2:
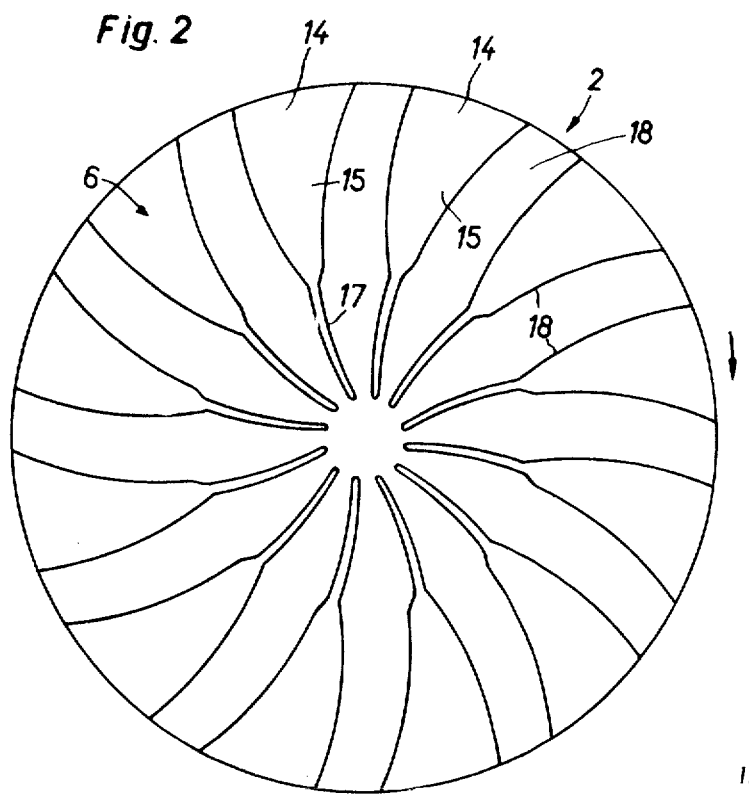
Figure 4:
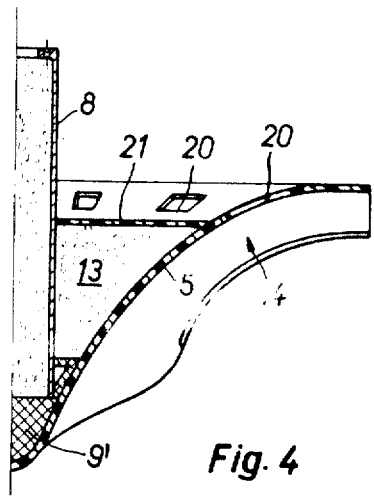
Figure 5:
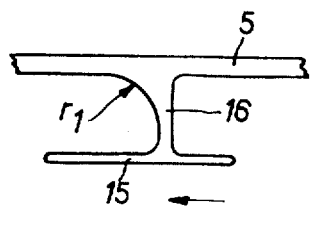
Figure 6:
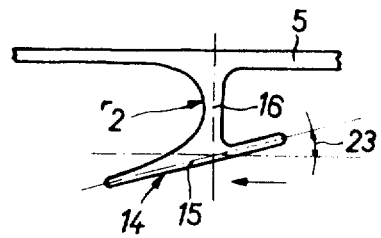
Figure 7:
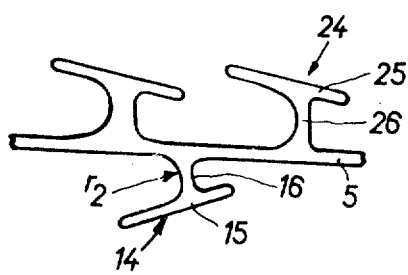

Embodiments of the invention are described in more detail hereinafter by reference to the accompanying drawings in which FIG. 1 represents an aerator impeller, partially in axial section and partially in side elevation, FIG. 2 is a plan view of the aerator impeller of FIG. 1 seen from the suction side, FIGS. 3 and 4 each show one-half axial section of modifications of the impeller, FIGS. 5, 6 and 7 are diagrammatic fractional views of different blade shapes and different bladings, seen from the peripheral delivery side of the impeller.

The aerator impeller 1 represented in FIGS. 1 and 2 comprises a rotor body 2 having a guide wall 5 diverging from a lower suction side 3 towards an upper peripheral delivery side 4 which is provided with a rim of blades 6.

The rotor body 2 is composed of a carrier pipe 8 extending coaxially with the axis of rotation 7, which pipe is provided at its upper end with a mounting flange 9 for a driving shaft not shown in detail. The lower end of the pipe 8 is closed by an approximately cone-shaped plug 9' having its edge 12 engaging over the pipe 8. The guiding wall 5 is fixed to the external surface of the plug 9', this wall having the shape of a surface of revolution diverging from below towards above and having an outwardly concave generatrix.

A mounting ring 10 projecting in truncated cone shape from the pipe 8 is provided on the upper section of the pipe 8, which ring serves for fixing an upper closure wall 11 extending until the circumference of the guide wall 5 where it is connected to the same.

In this manner the guide wall 5 together with the closure wall 11 forms a closed hollow body axially traversed by the pipe 8 and which in the example shown is provided with a filling 13, e.g. of plastics material and forms a practically insubmersible floating body.

The guide wall 5 and the closure wall 11 can be produced without great difficulty from drawn sheet material, e.g. from aluminum and assembled with a metal pipe 8 to a metal body 2. In the present case, however, it is preferred, to make guide wall 5 and the closure wall 11 from plastics. A construction of glass-fiber-reinforced polyester resin has proven suitable, which can be manufactured economically, also for a smaller scale of production. A styrene-polymer or copolymer foamable in situ, or a plastic material on the basis of polyurethane foamable in situ is particularly suitable as filling.

The blade rim 6 consists of single blades 14—here twelve—which, compare FIG. 2, extend approximately ray-shaped from the suction side 3 until the peripheral delivery side 4. The blades 14 have a T-shaped profile, the transverse flange or yoke 15 of the T-profile being fixed to that longitudinal edge of the web 15 which is remote of the guide wall 5, the web 16 forming a part of the blade 14. The width of this yoke 14—as seen from the delivery side—with progressive approach towards the axis of rotation 7, decreases from a maximum value in order to completely vanish after about two-thirds of the total length of the blades 14. In other words, the blade 14 initiates when viewed from the suction side 3, first with an extension 17 in alignment with the web 16, from which extension, upon increasing distance from the axis 17, the flanges of the T-profile gradually form and increase in width.

The totality of the yokes 15 forms accordingly a kind of "external guide wall" as this is usual with rotary pumps, but this external guide wall is of slotted between the individual webs 16, i.e. through the entire length of the blades 14. Such a slot is designated by 18 in FIG. 2.

The width of the extension 17 of the web 16 increases, as seen from the suction side, from zero until a maximum value. At this point the transverse flange or yoke 15 begins to form while at the same time the height of the web 16 again decreases.

From the above remarks it is clearly visible that the effect of the described impeller is very similar to that of a pump impeller, i.e. it has a pronounced pumping action and accordingly guarantees a greater input than a conventional "open" impeller. At the same time, however, no end edges are present which extend transversely to the direction of flow and accordingly could form starting points for clogging with solid matter, since filamentous solid materials which may possibly remain attached on the suction side, will be entrained by the liquid flow itself along the edges extending in the direction of flow and will be expulsed again, without being able to initiate clogging.

Moreover it is clearly visible that the liquid delivered during operation of the impeller along the blades 14, owing to the slots 18, is always in intimate contact with the external air, which guarantees a thorough aeration.

It is understood that the represented impeller in principle can be driven in both directions. When the impeller represented in FIG. 1 is driven in the direction of the arrow indicated in FIG. 2, its conveying capacity is slightly smaller, since the blades are curved in their longitudinal direction. However, the leading longitudinal edge of the yoke 15, as seen in the direction of rotation, projects further beyond the web 16 than the trailing edge of the yoke (see FIG. 1); therefore the difference between the conveying capacities dependent on the direction of rotation, though it can be measured, is not prejudicial.

Figure 3:
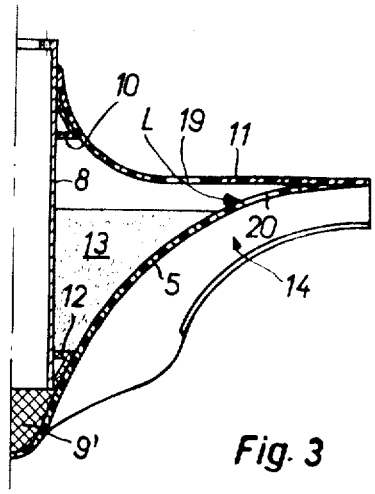

In the modification represented in FIG. 3 there is recognized the guide wall 5, the carrier pipe 8 with the components 9, 10 and 12, as well as the upper closure wall 11. The essential difference with respect to the form of embodiment of FIG. 1 consists in that the foamed plastics filling 13 does not occupy the entire hollow space which is enclosed by the guide wall 5 and the closure wall 11. The filling only comprises the lower portion of this hollow space. The closure wall 11 is formed with throughgoing openings 19 at uniform angular distances and the guiding wall 5 with corresponding openings 20. These openings 19 and 20 form together an additional air passage through which further air is sucked in the direction of the arrow L, which air is entrained by the liquid conveyed by the blades 14.

The form of embodiment represented in FIG. 4 is formed in similar manner. The difference with respect to FIG. 3 consists in that the closure wall 11 is no longer present. The filling material 13 here is covered by an annular disc 21 which not only seals the filling 13 towards the outside, but also centers the guide wall 5 with respect to the pipe 8 and mechanically braces it, since the annular disc 21 is connected, e.g. bonded with the pipe 8 and the guide wall 5, respectively at its inner as well as at its outer circumference. In FIG. 4 the guide wall again is provided with openings 20, serving to supply additional air.

With reference to FIG. 5-7 some blade shapes shall be discussed.

The blade shape according to FIG. 5 comprises a yoke 15 placed asymmetrically on the web 16. On the side of the web 16 on which the yoke 15 projects further beyond the web 16, its transition into the guide wall 5 is formed by a pronounced radius of curvature $r_1$ which, as has been experienced upon operation of the impeller, has a particularly favorable influence on the conveying and input characteristics of the impeller.

In the blade indicated in FIG. 6 the yoke 15 is placed not at right angles to the web 16 as in FIG. 5, but at an angle of incidence 23. The web 16 itself is formed on one side with a circular arc-shaped profile having a large radius of curvature $r_2$, so that a stepless transition results from the guide wall 5 until the side of the web 15 facing the guide wall.

In FIG. 7 there is shown a fragment of the peripheral pressure side of an impeller which is provided with blades on the internal as well as on the external side. In such an impeller the guide wall 5 consists of a hollow truncated cone of which the inner and outer cone surface is provided with blades. This method of construction, obviously requires a certain technical expenditure, particularly with respect to the coupling connection between impeller and driving means. On the other hand, by means of the double blading the delivery output can be increased quite considerably, or with a constant input the impeller can be made smaller.

In FIG. 7 the portion of a guide wall 5 is recognized, which in this case is to be imagined as the cone surface of a downwardly open truncated cone. The outer cone surface carries a ring of blades 14 which are constructed similarly to the blades of FIG. 6. The inner cone surface also is provided with a ring of blades 24 which extend from the pressure side along the internal cone surface until about the lower opening of the truncated cone surface of the guide wall 5. The blades 24 have a similar profile as the blades 14 of FIGS. 6 and 7, namely a T-shape profile with a web 26 and an asymmetrical yoke 25 placed under an angle of incidence with respect to the web 26.

The uppermost edges of the yoke 25 can be connected to each other by means of a ring (not shown), to which is attached a carrier star in turn connected to the driving shaft.

I claim:

1. Vertical axis aerator impeller for aeration of liquids, particularly of sewage to be clarified, comprising a rotor body diverging from a lower suction side to an upper delivery side, the rotor body being provided with at least one blade rim having blades formed with a T-shaped profile, said blades being fast with the rotor body along the free longitudinal edge of the web of the T-shaped profile.

2. An aerator impeller according to claim 1, in which the T-shaped profile of the blades comprises a yoke having a wider yoke section along one side of the web of the T-profile and a narrower yoke section along the other side of the web.

3. An aerator impeller according to claim 2, in which the blades are longitudinally curved in circumferential direction, said wider section of the yoke extending along the concave side of the curved web.

4. An aerator impeller according to claim 1, in which the width of the yoke of the T-shaped profile continuously increases from zero value towards the delivery side of the impeller.

5. An aerator impeller according to claim 4, in which the web of the T-shaped profile seen from the suction side of the impeller increases from zero value until a point of maximum value intermediate the length of the web, the yoke of the T-shaped profile continuously increasing in width from zero value at said point towards the delivery side, while the height of the web again continuously decreases from said point towards the delivery side.

6. An aerator impeller according to claim 1, in which the rotor body is a body of revolution the generatrix of which forms an arc of an ellipse having its major axis extending in a plane situated at right angles to the axis of rotation of the impeller.

7. An aerator impeller according to claim 1, in which the rotor body is formed as a floating body.

8. An aerator impeller according to claim 1, in which the rotor body is formed as a hollow cone surface of a body of revolution of truncated cone shape, both inner and outer surfaces of said hollow cone being provided with blades.

9. An aerator impeller according to claim 2, in which the yoke of the T-shaped profile of the blades is placed on the web of the profile to form an angle of incidence therewith, the free side edge of the wider section of the yoke being at a greater distance from the rotor body than the free side edge of the narrower yoke section.

10. An aerator impeller according to claim 3, in which the curve of transition of said web into the rotor body on the concave side of the blade has a greater radius of curvature than the curve of transition of the web into the rotor body on the convex side of the blade.

11. An aerator impeller according to claim 9, in which said web on the side of the wider section of the yoke of the T-shaped blade profile is defined by a circularly curved cylindrical surface portion.